Patented Jan. 11, 1927.

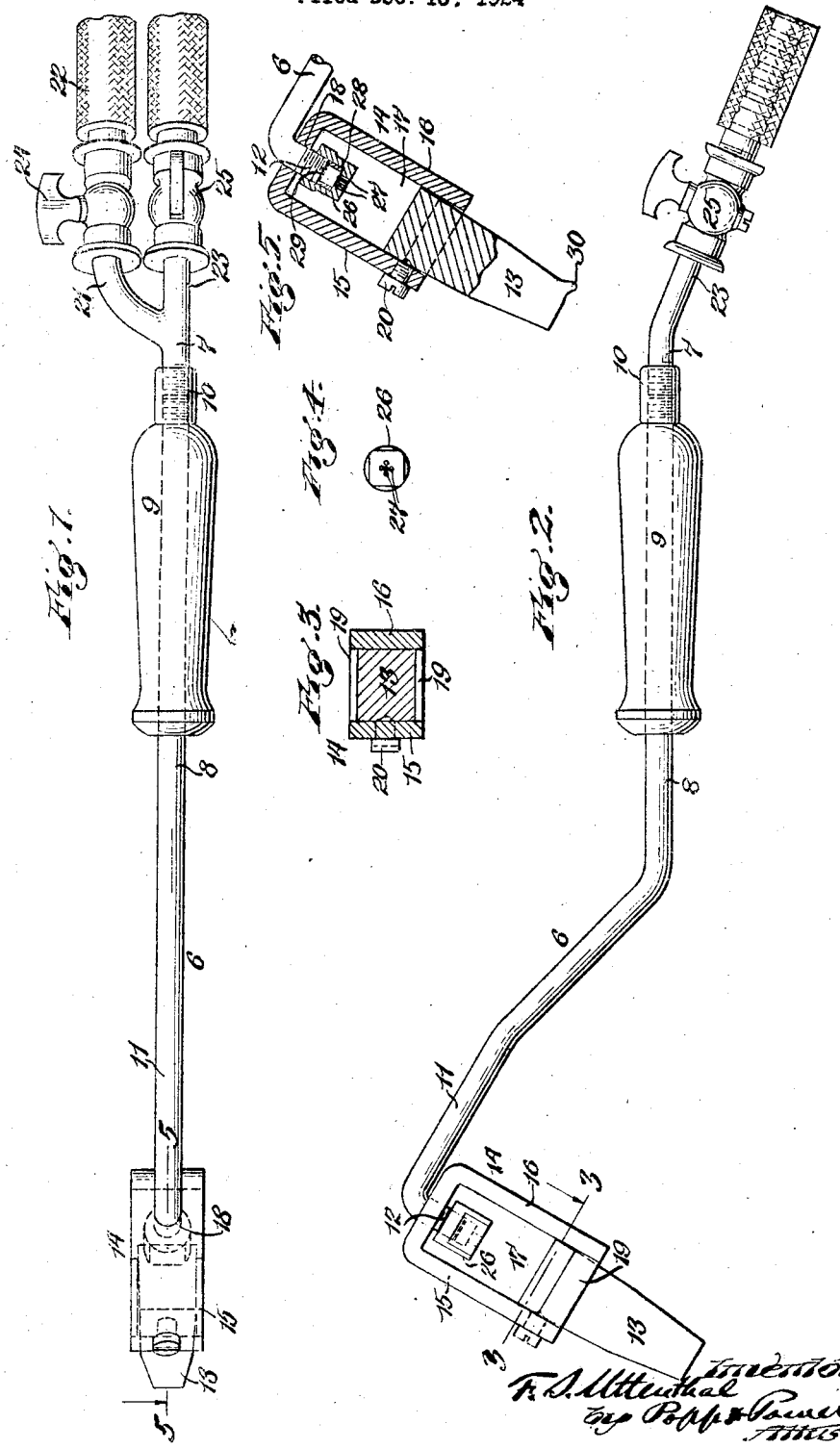
Jan. 11, 1927.
F. S. UTTENTHAL
SOLDERING IRON
Filed Dec. 15, 1924
1,614,090

1,614,090

UNITED STATES PATENT OFFICE.

FOLMER S. UTTENTHAL, OF BUFFALO, NEW YORK, ASSIGNOR TO KAREN UTTENTHAL, OF NEW YORK, N. Y., AND TEKLA NIELSEN, OF BUFFALO, NEW YORK.

SOLDERING IRON.

Application filed December 15, 1924. Serial No. 755,832.

This invention relates to a soldering iron and more particularly to that type of soldering iron known as a gas heated soldering iron.

One of the objects of this invention is to provide a soldering iron in which the parts are so organized that a relatively small flame can be used resulting in a low gas consumption and a small dissipation of heat as well as eliminating the danger of throwing the flame against the object being soldered.

A further object is to make the bit or head of the soldering iron readily and conveniently removable so that the iron can be quickly adapted to various conditions and kinds of work.

A still further object is the provision of an iron of such form that it is light, convenient to operate and of simple and inexpensive construction.

In the accompanying drawings:

Figure 1, is a top plan view of the soldering iron showing suitable hose connections by which it is supplied with gas and air.

Figure 2, is a side elevation of the same.

Figure 3, is a transverse section taken on line 3—3, Figure 2.

Figure 4, is an end view of the burner head.

Figure 5 is a fragmentary sectional elevation of the head and burner of the soldering iron, the same being taken on line 5—5, Fig. 1.

Similar reference numerals indicate similar parts in each of the several views.

In its general organization my improved soldering iron comprises a tubular supporting body or shank which is forked at its rear end forming two branches one of which is adapted to be connected with an air or oxygen pressure tank, and the other with a pressure gas supply, a removable bit, preferably made of copper supported at the front end of said hollow shank, and a burner mounted at the front end of said shank and adapted to direct a plurality of flames against said bit.

The hollow supporting body or shank forms a conduit through which the mixed fuel and oxygen is supplied to the burner and is preferably composed of two sections 6 and 7 made of pipe or tubing. The iron is adapted to be grasped about its shank and for this purpose the rear end 8 of the front section 6 is disposed horizontally and provided with a longitudinal grip or handle 9 which is preferably made of wood or brass. To facilitate the assembling and replacing of this grip the front and rear pipe sections are joined by a coupling 10 having the form of a sleeve into which the opposing ends of the two sections are screwed, so that upon uncoupling these parts the grip can be slid longitudinally off of the pipe section. The portion 11 of the shank extending forwardly of the grip is bent or formed in the shape of a gooseneck and the extreme forward end 12 of the same is inclined downwardly and forwardly forming a nipple which is threaded externally for a purpose which will presently appear.

The means for supporting the bit 13 comprises a U-shaped supporting member or yoke 14 having upper and lower jaws 15 and 16 respectively which extend downwardly and forwardly substantially parallel with the nipple 12 to which the yoke is secured. These jaws are somewhat wider than the bit and form an open sided chamber 17 in which the burner is arranged. To securely fasten the yoke to the shank, the yoke is provided in its upper side with an opening 18 in which the nipple is welded or otherwise suitably secured.

The lower ends of the jaws of the yoke are joined by two longitudinal bridge bars 19, 19 which are arranged between the legs and are welded to the same on opposite sides of the yoke and form a support for the copper bit which is adapted to be held between the same. The copper bit is shown as square in cross section but it is to be understood that any size or form of bit may be used to suit the requirements of the work at hand. To securely fasten the copper bit between the jaws and bridge pieces a set screw 20 is provided on the upper jaw which is adapted to engage the copper bit as best shown in Figure 5. The copper bit is preferably so adjusted that the end thereof is substantially in line with the axis of the grip which renders the iron more convenient to operate.

The rear section 7 of the supporting body or shank is forked, one branch 21 of said fork being adapted to be connected with a source of air or oxygen under pressure by means of a flexible hose 22 and the other branch 23 being adapted to be connected in a similar manner with a source of fuel gas under pressure, such as acetylene or illuminating gas. Valves 24 and 25 of any suitable and well known form are provided in each of these branches to permit the flow of fuel gas and oxygen to be separately regulated and controlled. By introducing the gas and oxygen at a point in rear of the grip, the hollow shank operates as the mixing chamber and thereby enables the head of the iron to be made very compact which permits the use of a much smaller flame effecting a material saving in fuel since less heat is dissipated by the head.

The burner head 26 is in the form of a cap which is adapted to be screwed on that part of the nipple 12 arranged within the yoke and is provided in its under side with a plurality of ports 27 through which mixed gas and oxygen is forced into the chamber 17, where it is ignited, and against the upper end of the copper bit. The outer end of this cap is preferably squared so that it can be easily removed and replaced by means of an end wrench. A spacing sleeve 28 of suitable length is arranged within the cap and interposed between it and the adjacent end of the pipe, and intermediate this sleeve and the end of the pipe is arranged a disk 29 of metal gauze or fine mesh screening which is adapted to prevent a backfire of the flame through the hollow shank and also insures a thorough mixture of the fuel gas and air. By providing the burner head with a plurality of ports which are adapted to direct a number of small flames against the upper side of the copper bit, the copper is heated more uniformly and it is possible to use a shorter and less energetic flame than would be possible if a single flame were used which reduces the danger of throwing the flame against the work and also renders the iron more comfortable to operate.

By mounting the copper bit in the manner specified it is possible to use scrap copper of a wide variety of shapes and sizes for this purpose, thereby effecting a considerable economy since these bits have to be replaced quite frequently due to the wear in cleaning off the hardened solder. Moreover a head of this character can be readily removed and hammered into a particular shape as for very fine work, as shown at 30 in Figure 5, after which it can be easily restored.

It is apparent that by providing a supporting yoke having open sides the products of combustion are deflected away from the operator and his eyes are also shielded from the flame. Moreover in this construction there are no small ports liable to become covered with solder, and the burner head, by reason of its position is well protected.

As a whole this soldering iron is extremely durable, simple and inexpensive to operate and is also very light, comfortable and convenient to use permitting it to be used under a wide variety of conditions and in various kinds of work.

I claim as my invention:—

In a soldering iron of the character described, a single tubular shank forming a mixing chamber, means for supplying fuel gas and oxygen to said shank, said shank being formed to provide a horizontal central handle portion, the front portion thereof extending upwardly in the form of a gooseneck, a supporting member secured to the front end of said shank and extending downwardly and forwardly therefrom, a bit mounted in the lower end of said supporting member, the lower end of said bit being substantially in line with the axis of said central handle portion, and a burner mounted on said shank within said supporting member and adapted to direct a flame against said bit.

FOLMER UTTENTHAL.